United States Patent [19]
Graat et al.

[11] 3,947,217
[45] Mar. 30, 1976

[54] PROCESS AND APPARATUS FOR THE PRODUCTION OF INERT GAS

[75] Inventors: Johannes W. Graat, Overasselt; Johannes C. H. Pelser, Weurt; Bart C. Hoornenborg, Nijmegan, all of Netherlands

[73] Assignee: Smit Nijmegan B.V., Nijmegen, Netherlands

[22] Filed: July 23, 1973

[21] Appl. No.: 381,894

[30] Foreign Application Priority Data
Sept. 22, 1972 Germany............................ 2246742

[52] U.S. Cl. ......................... 431/12; 23/281; 431/76
[51] Int. Cl.² ......................... F23N 1/02; F23N 3/08
[58] Field of Search ............... 431/8, 76, 12; 23/281

[56] References Cited
UNITED STATES PATENTS

| | | | |
|---|---|---|---|
| 3,177,150 | 4/1965 | Cameron | 23/281 X |
| 3,215,503 | 11/1965 | Nessler | 23/281 |
| 3,369,749 | 2/1968 | Siegmund et al. | 431/76 X |
| 3,389,829 | 6/1968 | Stanford | 23/281 X |
| 3,400,650 | 9/1968 | Burg | 23/281 X |
| 3,579,308 | 5/1971 | Gower | 23/281 |
| 3,725,012 | 4/1973 | Gower | 23/281 |
| 3,768,955 | 10/1973 | McLaughlin | 431/12 |
| 3,776,164 | 12/1973 | Westrum | 23/281 X |
| 3,777,928 | 12/1973 | Kober | 23/281 X |
| 3,814,570 | 6/1974 | Guigues et al. | 431/12 X |

Primary Examiner—Charles J. Myhre
Assistant Examiner—William C. Anderson
Attorney, Agent, or Firm—Fitch, Even, Tabin & Luedeka

[57] ABSTRACT

Inert gas is produced by the combustion of hydrocarbon fuel and air in a combustion chamber. The gaseous product of the combustion is cooled in a scrubbing chamber.

The amount of inert gas produced is measured, and in accordance therewith the fuel-to-air ratio of the combustion is controlled discontinuously between set time intervals.

14 Claims, 4 Drawing Figures

PROCESS AND APPARATUS FOR THE PRODUCTION OF INERT GAS

The present invention relates to a process for the production of inert gas as the exhaust gas from the combustion of a hydrocarbon-containing fuel with air and with subsequent cooling, the fuel/air ratio is controlled in accordance with the proportion of a characteristic component of the inert gas produced as monitored by gas analysis, and to an apparatus for carrying out such process and comprising a combustion chamber, a subsequent scrubbing and cooling device for the inert gas, a compressor for transporting either the combustion air or the inert gas, and an analyzer for the continuous measuring of characteristic components of the inert gas.

It is already known (German patent application 1,667,613 laid open to public inspection) to effect in processes of the above-described type a continuous control of the combustion air, especially of the excess quantity of combustion air discharged by a bypass, in accordance with the continuous analysis of the characteristic components of the inert gas produced in the combustion, such as CO, $H_2$.

However, this process for the production of inert gas

Particularly in the case of great variations of the conditions of operation, e.g. of the temperature and of the moisture content of the combustion air drawn in, substantial variations in the gas constituents could not be avoided. d suffers from certain disadvantages. Not only does the above control result in reaction inefficiency, but large variations in the amount of inert gas produced also result.

Further, it has been found that the conventional apparatuses for the production of inert gas are of complicated construction and uneconomical in operation.

Accordingly, it is the object of the present invention to provide a process for the production of inert gas wherein, by means of an improved control, a constant quality of the inert gas produced is guaranteed even in the case of greater variations of the operational conditions, e.g. in the case of variations of the fuel value or of the quantity of the fuel supplied, and in the case of variations of the quantity or of the moisture content as well as of the temperature of the combustion air supplied.

Another object of the present invention is the provision of a process and of an apparatus for the production of inert gas by means of which the quality of the inert gas produced can be improved on the whole in comparison with the existing systems, and which permit the inert gas to be produced in a particularly economical, trouble-free and safe manner.

According to the invention, this object is solved in that during the continuous measuring of the characteristic component of the inert gas the adjustment of the quantity of air supplied is performed in equal time intervals and discontinuously.

Advantageously, the adjustment of the valve controlling the quantity of air can be performed in intervals of 5 seconds up to a maximum of 20 seconds, and the adjustment may involve a suspension period of about 8 seconds with a set period for the variation of the quantity of air supplied of about 2 seconds.

In order to provide for an easy, operationally safe control, the transmission of the control signal may advantageously be performed by electrical means, and the magnitude of the variation of the signal depends on the deviation of the actual value from the set point value, whereby no control signal is provided within predetermined limits of the set point value.

Naturally, as an alternative the set period may be varied, too in response of the deviation of the actual value from the set point value with the intervals between the adjustments remaining constant.

Preferably, the apparatus for carrying out the process according to the invention is characterized by regulating elements for the regulation of the discharge of the excess combustion air or of the inert gas introduced into the combustion air or of the combustion air supplied or drawn in by the bypass flow, which regulating elements are adapted to be positioned by a servomotor into their fully open or closed position; a servomotor which acts upon said regulating elements in response of the magnitude of time limited signals succeeding each other with intervals therebetween; and a measuring transformer including a step or increment controller for the production of the control signals.

On the whole, the control according to the invention, in a manner being surprising to the expert, even under severe conditions of operation, e.g. on a seagoing vessel, is not only more reliable, but also more exact than conventional control means. It has been found that oscillations of the control do not occur, that unjustified switch-off of the system does not take place and that the system and the process thereby on the whole are more economical in operation than previously known systems and processes.

In the following, exemplary embodiments of the invention are explained in greater detail by referring to the enclosed drawings, wherein.

The process and the apparatus according to the invention are useful for the production of inert gas with minimum contents of oxygen and carbon monoxide. Inert gas of this kind is used in navigation and in the field of transportation for filling tanks as well as for fire extinguishing purposes and as a protective gas in the transport of perishable goods, e.g. fish flour, and, finally, also, in cold-storage depots and the like.

As shown in the Figures, a system according to the invention comprises essentially a combustion chamber or burner 10 which is continuously and uniformly fed with a liquid fuel through a pump 12 or with a gaseous fuel, a subsequent cooling device, e.g. a scrubbing tower 14, and not illustrated further cooling and/or drying devices for the resulting inert fuel gas (inert gas).

Figure 1:
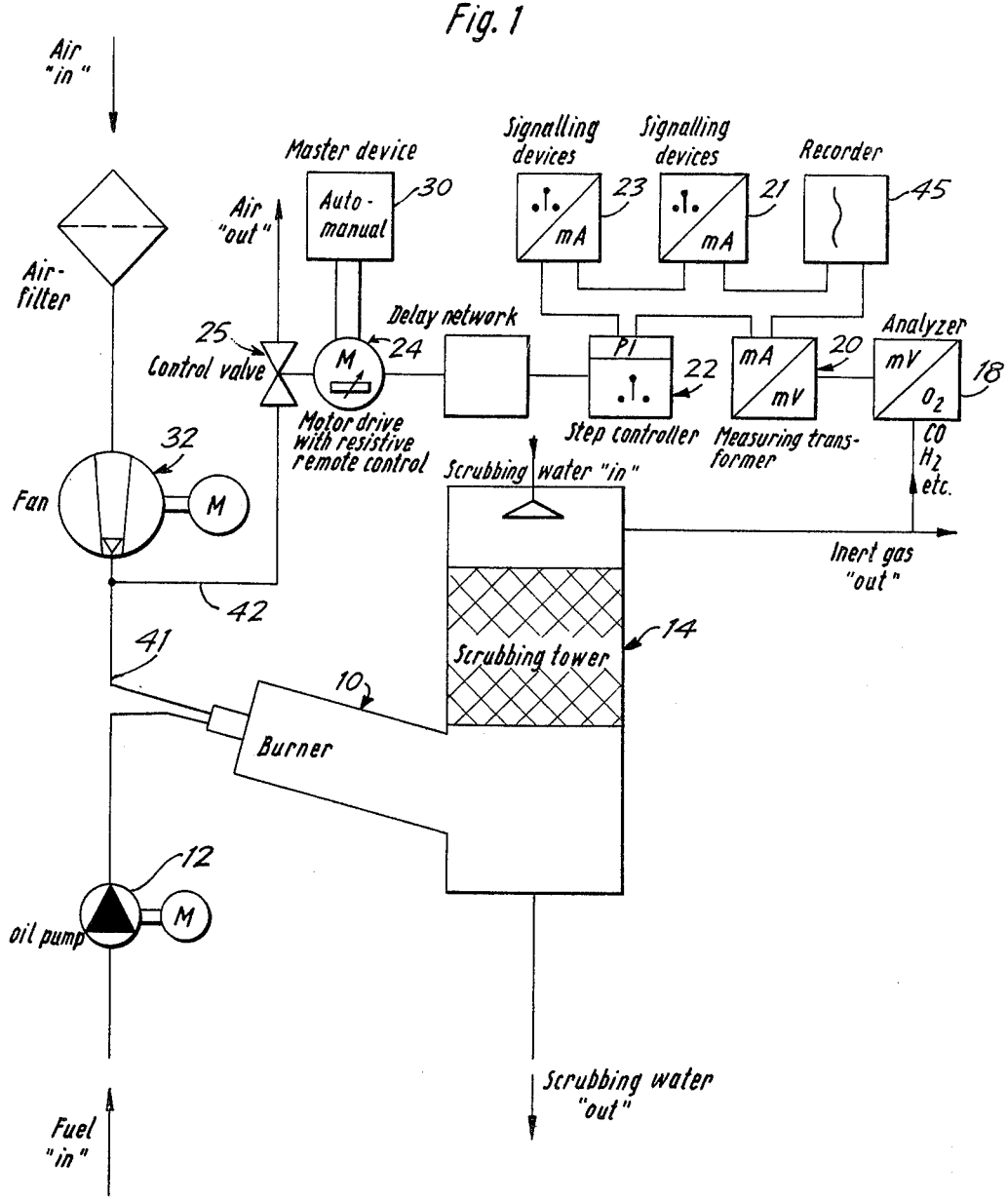
FIG. 1 shows the flow diagram of the process according to the invention including a throttling of the outflowing excess combustion air.
Figure 2:
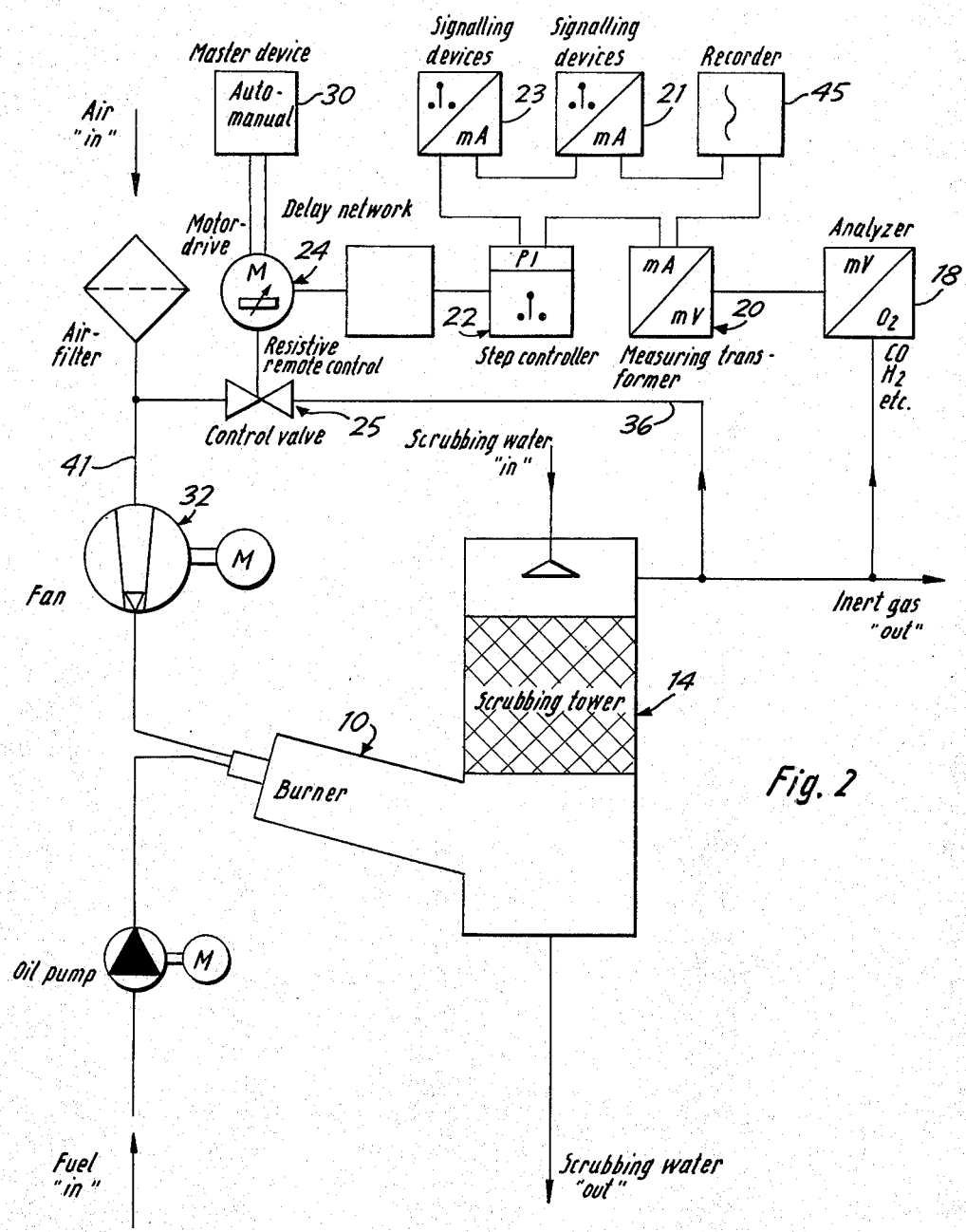
FIG. 2 shows a flow diagram of the process according to the invention including a throttling or restriction of the quantity of the inert gas produced which is fed into the intake air.
Figure 3:
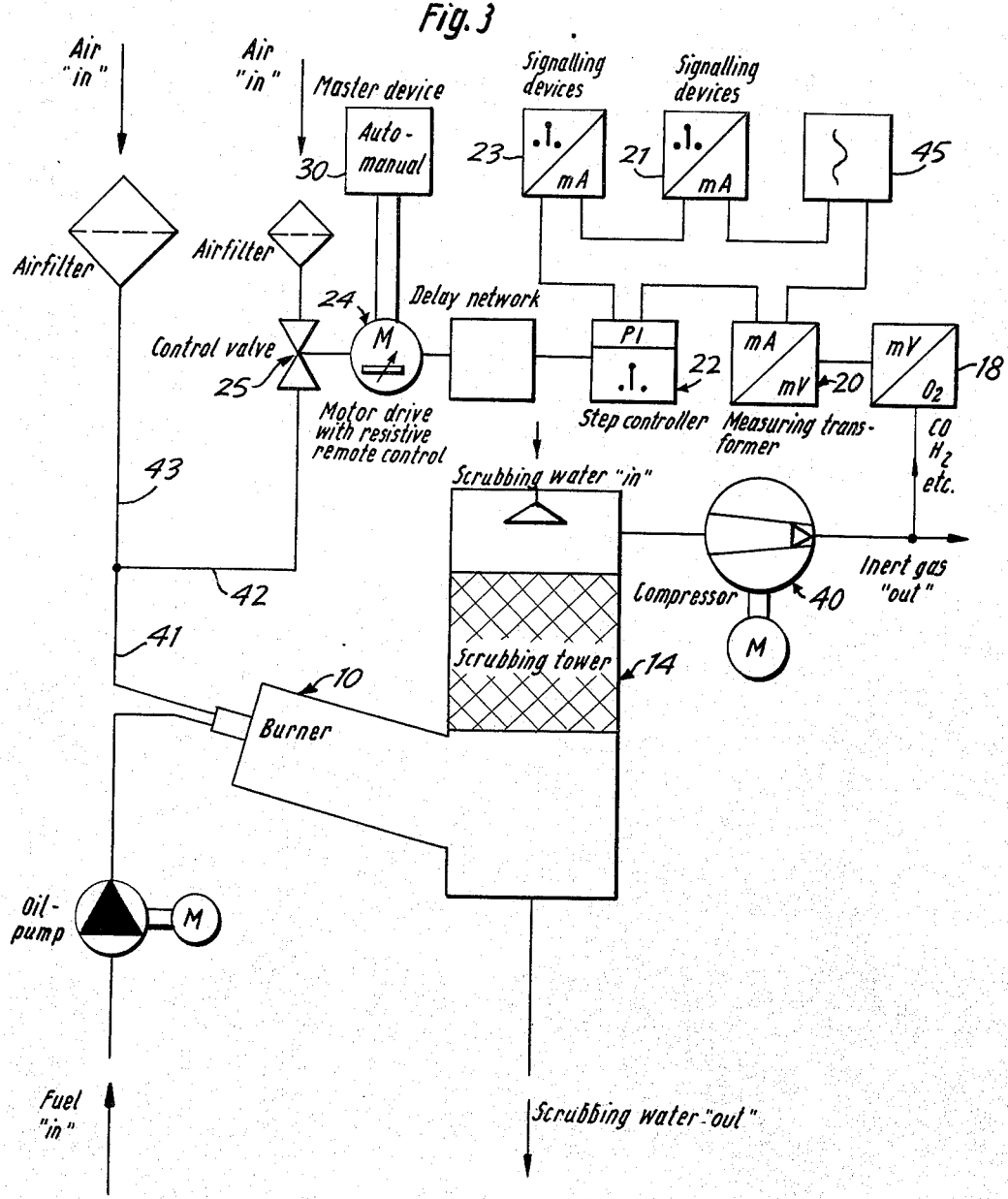
FIG. 3 shows a flow diagram of the process according to the invention including a throttling or restriction of the combustion air drawn in through the combustion with the main flow.
Figure 4:
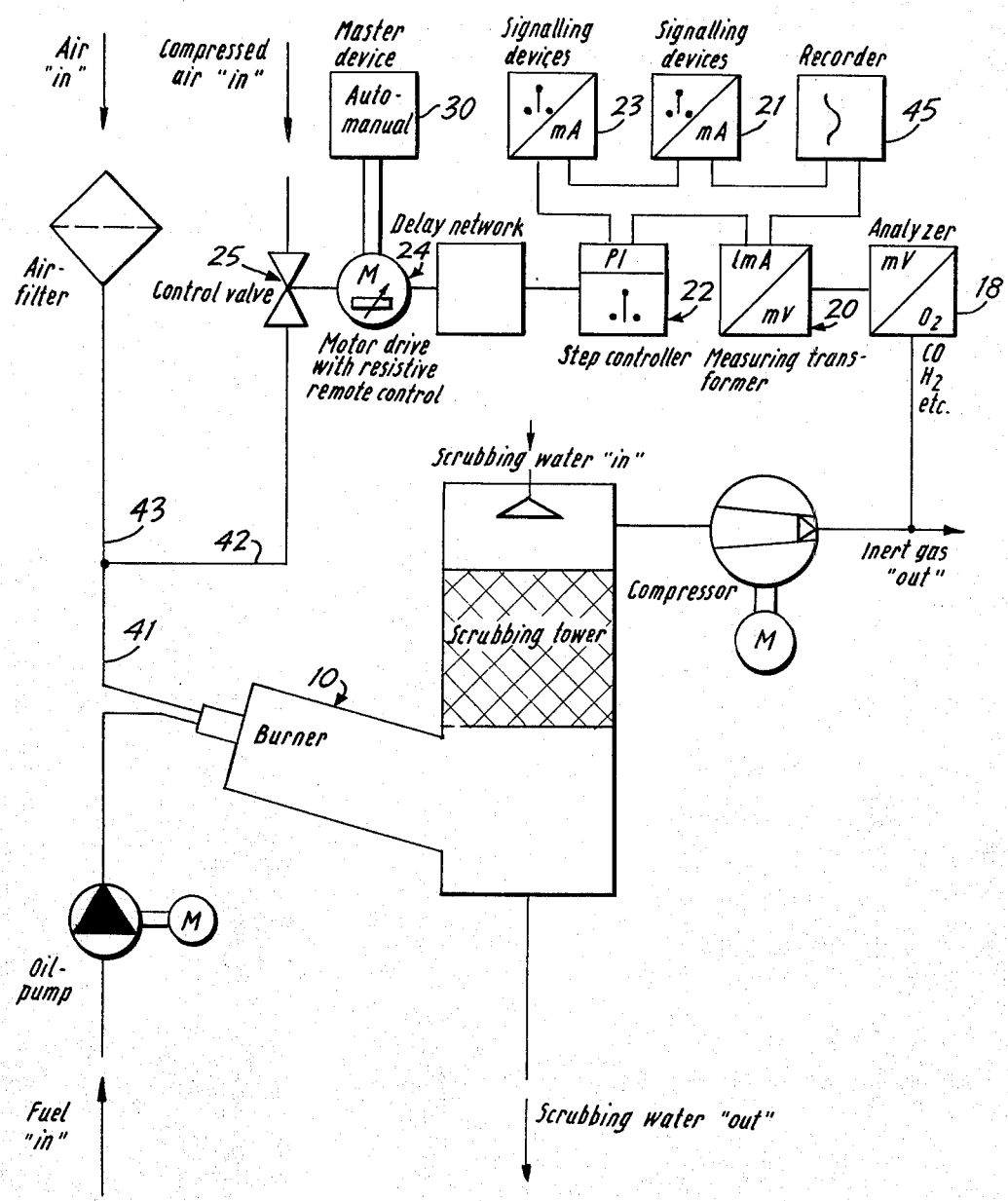
FIG. 4 shows a flow diagram of the process according to the invention including a controlling of compressed air introduced into the combustion air in the bypass flow.

The combustion air is either compressed, as shown in FIGS. 1 and 2, prior to being supplied to the combustion, or, as shown in FIGS. 3 and 4, drawn through the combustion chamber 10 and compressed only upon exit from the scrubbing flow or from the cooling system, and transferred to a point of consumption.

The scrubbing flow and the cooling system may operate with sea water which is continuously drawn in and discharged.

Since the combustion chamber 10 is fed with combustion air in a stoichiometric ratio to the fuel or nearly at such ratio, respectively, a gas is formed in the combustion chamber which gas in addition to $N_2$ and $CO_2$ contains minor traces of $CO, H_2$ and $O_2$.

The gas produced is continuously analyzed by an analyzer 18 for its contents of the above-mentioned gas components, and the analyzer 18 provides a signal to a measuring transformer 20 in proportion to the resulting components, whereby the proportional values of this measuring transformer are continuously registered by a recorder 45 and which transformer provides a signal by an audio signaling device 21 and/or a visual signaling device 23 if pre-settable maximum values are exceeded.

Then, the signal produced by the measuring transformer is applied via an increment or step controller 22 in regular intervals to a servomotor 24 for the setting of the control or regular elements 25 for the combustion air.

Preferably, the signal which is given off by the measuring transformer 20 in response of the deviation of the actual value from the set point value, is proportional to the deviation or difference of the measured values, and the motor 24 for the adjustment of the regulating elements 25 during its constant period of adjustment will then open or close the regulating elements 25 to greater or lesser degree in proportion to the adjustment signal.

In another embodiment of the invention, the step controller 22 may vary also the period of adjustment or the interval between the periods of adjustment to thereby obtain a different degree of adjustment of the regulating elements 25 at constant revolutions of the motor 24 per unit of time.

Furthermore, the servomotor 24 for the regulating elements 25 can be operated manually by manual central means 30. Since the regulating elements 25 are adjusted by the servomotor 24 within a predetermined range only, under certain circumstances it may be also necessary to manually adjust the location of the range of adjustment when the admissible tolerances for the contents of $O_2$, CO or $H_2$ are exceeded. Such exceeding is possible to occur with greater variations of the condition or consistency of the substances to be burned.

Alternatively, a system as shown in FIGS. 1 to 4 can be employed for the arrangement of the regulating elements for the control of the intake air quantity for the burner.

According to FIG. 1, a fan 32 for the combustion air provides a certain excess of air, and such excess is vented over a conduit 42 and through a control valve serving as the regulating element 25. Then, amount of vented air may be adjusted by means of the above-mentioned regulating elements 25, so that a very precise adjustment of the combustion air supplied over conduit 41 by controlling a relatively small quantity of air in the conduit 42.

As shown in FIG. 2, a feeding of excess air may be dispensed with if a small portion of the inert gas produced is fed via a conduit 36 into the input conduit 41 leading to the burner 10. The proportion of air in the mixture supplied to the burner 10 is varied while maintaining a constant throughput through the fan 32; thus, in this case too, the full quantity of the air supplied can be adjusted exactly with small increments of regulation or control in the conduit 36, such that it may be adapted to variations of the conditions or consistency of the components supplied.

In FIG. 3, a compressor 40 is positioned at the output side of the burner 10 and of a cooling device 14. In this case, the combustion takes place at reduced pressure, and the combustion air is drawn in the form of a main flow in conduit 43 and a bypass flow through conduit 42. In this embodiment, the bypass flow which is a fraction of the main flow only, may be controlled in most easy manner, and according to FIG. 4, the intake air admitted by the bypass flow conduit 42 can be supplied in the form of compressed air, whereby in this case the quantity of the relatively small proportion of compressed air supplied may be easily controlled.

Naturally, in a further embodiment of the invention the stream of compressed air, as shown in FIG. 4, flowing inward through conduit 42 may be combined with a constant rate of flow through conduit 43 and a fan according to FIG. 1.

Now, it is the principle of the control according to the invention that the control signals are not applied continuously as would seem to be self-evident, but rather discontinuously with substantial intervals between the signals. For example, the signal may be applied during a period of 2 seconds with interval of 8 seconds.

It has been found to be of particular advantage if certain deviations or differences do not cause controlling operations to be performed, but that control signals are provided only when upper or lower limits are exceeded. For example, in the case of an average value of a gas proportion of 0.3%, the control limits may be at 0.35% as the maximum value and at 0.25% as the minimum value.

As is known per se, it is not only possible to produce a signal parallel to the signal production when the admissible values of proportion in the inert gas are exceeded; rather, a venting of the then produced inert gas may be initiated, too. However, such venting is only performed if the admissible values of proportion are present for a given period of time, e.g. of some minutes. This avoids a venting from occuring in the case of troubles lasting only a short time.

Obviously, the process and the apparatus according to the invention offer a solution to the problem of the inert gas production, which solution in the sum and in the combination of its advantages must be surprising to the expert.

What we claim is:

1. A process for the production of inert gas comprising supplying an air mixture to a combustion chamber, supplying a hydrocarbon fuel mixture to said combustion chamber, combusting said hydrocarbon fuel mixture with said air mixture to form certain gaseous products, cooling said gaseous products, measuring the quantity of a characteristic component of the inert gas in said gaseous products, and controlling said air mixture discontinuously at timed intervals with intervals therebetween of non-control in response to variations of the quantity of said characteristic component of inert gas exceeding predetermined limits by operating a regulator regulating a portion of the maximum quantity of air mixture fed to said combustion chamber.

2. A process in accordance with claim 1 in which the step of controlling said air mixture comprises changing the quantity of air mixture supplied to the combustion chamber in proportion to the amount by which said variations in the quantity of said characteristic component in said inert gas exceed said predetermined limits.

3. A process in accordance with claim 1 in which the step of controlling the air mixture comprises directing a portion of said gaseous products into the air mixture supplied to the combustion chamber in proportion to the amount by which said variations in the quantity of said characteristic component in said inert gas exceed said predetermined limits.

4. A process in accordance with claim 1 in which the step of controlling the air mixture comprises varying the time period of response in proportion to the amount by which said variations in the quantity of said characteristic component in said inert gas exceed said predetermined limits.

5. A process in accordance with claim 1 in which the step of controlling the air mixture comprises changing the degree of response over a fixed response interval in proportion to the amount by which said variations in the quantity of said characteristic component in said inert gas exceed said predetermined limits.

6. A process in accordance with claim 1 in which the step of controlling said air mixture comprises the additional step of adjusting the quantity of air supplied in intervals in the range of 5 to 20 seconds.

7. The process in accordance with claim 6 including the step of adjusting the quantity of air at two-second increments in the range of between 5 to 20 seconds.

8. The process according to claim 6 in which the step of controlling said air mixture includes the step of adjusting only when the magnitude of the variation of the measured quantity of said characteristic component in said inert gas deviates within predetermined limits of a predetermined value.

9. The process according to claim 1 in which the step of supplying an air mixture to the combustion chamber comprises the steps of conveying and compressing air in excess of that required for combustion and in which the step of controlling said air mixture includes the step of venting excess air prior to combustion.

10. A process in accordance with claim 1 in which the step of supplying an air mixture to a combustion chamber comprises the step of drawing air in a main flow and in a smaller bypass flow and in which the step of controlling said air mixture comprises the steps of controlling the intake of air of said bypass flow only.

11. The process in accordance with claim 10 including the step of compressing the air in said bypass flow.

12. An apparatus for producing inert gas comprising a combustion chamber, means for supplying an air mixture to said combustion chamber, means for supplying a hydrocarbon fuel mixture to said combustion chamber, means for combusting said fuel and air mixture to create gaseous products which contain inert gases, means to cool said gaseous products, measuring means for continuously measuring said gaseous products to determine the amount of a characteristic component of the inert gases in said gaseous products, regulating means controlling a portion of said air mixture fed to said combustion chamber, and means to control said air mixture discontinuously at timed intervals with intervals therebetween of non-control in response to variations of the quantity of said characteristic component of inert gas exceeding predetermined limits by operating said regulating means.

13. The apparatus of claim 12 in which said means to control said air mixture comprises a valve means flowably connected to said air supply means, means for opening said valve means to an extent proportional to the amount by which said variations of said quantity of said characteristic component in said inert gas exceed said predetermined limits and a timer means for activating said opening means for fixed adjustment periods at fixed time intervals.

14. The apparatus of claim 12 in which the means to control said air mixture comprises a valve means fixable only in a fully open or fully closed position, an opening means for opening said valve means and a timer means for activating said opening means for variable time periods, said variable time periods being proportional to the amount by which said variations of said quantity of said characteristic component in said inert gas exceed said predetermined limits, said variable time period spaced apart by fixed time intervals.

* * * * *